Aug. 15, 1939.   C. F. SCOTT   2,169,852

COFFEE MAKER

Filed Sept. 10, 1937

Inventor:
Carl F. Scott,
by *Harry E. Dunham*
His Attorney.

Patented Aug. 15, 1939

2,169,852

UNITED STATES PATENT OFFICE 2,169,852

COFFEE MAKER

Carl F. Scott, Milford, Conn., assignor to General Electric Company, a corporation of New York Application September 10, 1937, Serial No. 163,280

6 Claims. (Cl. 53—3)

This invention relates to coffee makers, and it has for its object the provision of an improved device of this character.

This invention contemplates an improved coffee maker which heats the water to the proper temperature, and brings it into contact with the coffee grounds under such conditions that a coffee brew is produced having an excellent flavor, and one that is free from coffee grounds. More specifically, this invention relates to improvements in the coffee maker described and claimed in the copending application of Roderick S. McNeil, Serial No. 166,313, filed September 29, 1937, and assigned to the same assignee as this invention. It is an object of this invention to provide a coffee maker of the type described in the McNeil application which will automatically measure and make a relatively small number of cups of coffee at a time, but which is adapted to make the maximum amount of coffee for which the coffee maker is designed.

Figure 1:
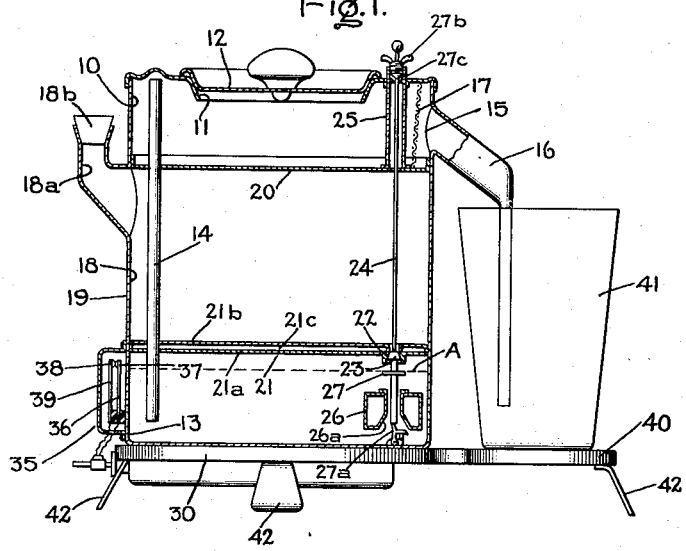
Figure 2:
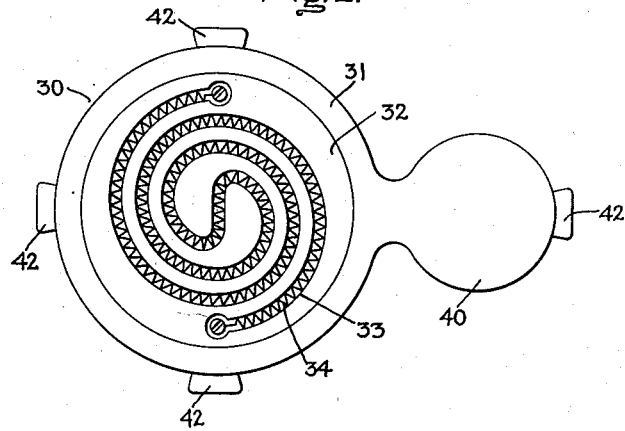

For a more complete understanding of this invention, reference should be had to the accompanying drawing in which Fig. 1 is an elevation mainly in section of a coffee maker embodying this invention; and Fig. 2 is a plan view of an electric hot plate for heating the coffee maker of Fig. 1 and arranged in accordance with this invention.

Referring to the drawing, this invention has been shown in one form as applied to a coffee maker operating on the principle set forth in the above-mentioned McNeil application. As shown, the coffee maker comprises a compartment 10 which is adapted to receive the coffee grounds to be steeped or infused. This compartment or container 10 is provided with a top opening 11 through which the coffee grounds are inserted. This opening normally is closed by a cover 12. A water heating vessel 13 is in liquid communication with the ground coffee receptacle 10 by means of a water delivery tube 14. In accordance with the McNeil coffee maker, the water that is heated in the vessel 13 is transferred through the tube 14 to the ground coffee container 10 by the generation of pressure in the vessel 13, the water that is transferred steeping or infusing the grounds in the vessel 10. The coffee brew that is formed by the steeping of the grounds is discharged from the coffee compartment 10 through a discharge port 15 that communicates with a depending discharge spout 16. A screen dam 17 is positioned before the port having a mesh so fine that it sets up a back pressure in the compartment 10. That is, it offers a resistance to the flow of the coffee grounds and brew from the coffee compartment. As pointed out in the McNeil application, this screen should have a rather fine mesh, such as approximately 200 per square inch.

In accordance with this invention, there is interposed between the ground coffee compartment 10 and the water heating compartment 13 a water reservoir 18. As shown, the three compartments are arranged one above the other. Preferably, the compartments will be enclosed by an outer relatively large cylindrical vessel 19, and they will be defined by transverse partitions 20 and 21 arranged horizontally and spaced one above the other as shown in the drawing. Entering the side wall of the vessel 19 to discharge into the reservoir 18 is a filler pipe 18a normally closed by a stopper 18b.

The reservoir 18 is relatively large as compared with the proportions of the water heating vessel 13 and the ground coffee compartment 10. The volumes of the latter two compartments 10 and 13 are substantially equal, although this is not necessary. The volume of the water reservoir 18 is such that it will make a relatively large number of cups of coffee such as six or eight. The volume of the water heating compartment 13 is such that it will hold only enough water to make say two or three cups of coffee.

Arranged in the wall 21 between the water heating compartment 13 and the reservoir 18 is a port 22 connecting these compartments. The port 22 is controlled by means of a valve 23 mounted on a rod 24. The rod 24 extends downwardly into the lower heating compartment 13 and upwardly through the top wall of compartment 10 to the top of the coffee maker, as shown. A tubular member 25 extends vertically from the bottom to the top wall of the coffee compartment 10 and the rod 24 extends through this tube, as shown.

Positioned within the water heating compartment 13 is a float 26 surrounding the portion of the rod 24 that projects down into the heating chamber. When the valve 23 is open and water flows down into the chamber 13 the float rises and eventually engages a shoulder 27 provided on the rod 24 and upon continued movement upwardly will eventually close the valve. This occurs when a predetermined quantity of water has been supplied to the compartment 13. In other words, the float automatically operates to close the valve when the desired measured quantity of water has been supplied to the compartment 13. Preferably, the valve 23 will be closed before the chamber 13 is completely filled so as to leave an air space above the liquid level. The maximum liquid level in compartment 13 is indicated by the line A.

When heat is applied to the compartment 13, the water in it is heated as described before and the pressure that ultimately is generated due to vapor and the heating of air above the liquid level A will force the small quantity of water up through the tube 14 into the coffee steeping compartment 10. The charge is pumped out rapidly and as the water is forced out, the float 26 drops to permit the valve 23 to again supply a charge of water to the heating compartment 13. This charge is again heated and transferred to the coffee compartment 10 to make another batch of coffee brew. It is preferable that the valve 23 remain closed until most of the water in the chamber 13 has been pumped out. To effect this, a suitable locking member 27a is pivoted in the compartment 13 under the rod 24. It is biased by its horizontal arm to occupy its position shown in Fig. 1 where it holds the valve closed. As the float 26 approaches the bottom of the vessel 13, its inclined wall 26a engages the member 27a to move it in a counter-clockwise direction against its bias to release the rod 24 and thereby permit the valve 23 to open.

The foregoing construction has the advantage that a small quantity of coffee brew equalling approximately the volume of the water heating compartment 13 may be quickly made. The remaining charge of water may be converted into coffee brew in succeeding charges by permitting the valve 23 to repeatedly operate whereby successive charges of water are heated in chamber 13 and pumped through the brew compartment 10.

Means are provided for holding the valve 23 open against the action of the float so that the maximum quantity of coffee may be made quickly. For this purpose, the rod 24 at the top passes freely through a wing nut 27b. The nut when turned inwardly engages a shoulder 27c on the rod forcing it downwardly into a complementary seat. This operation forces the valve 23 open and holds it open. When the valve is thus held open, the steam generated will collect in the top of reservoir 18 and will force the entire water supply up through the tube 14 into the brew compartment 10.

Preferably, the wall 21 will be heat insulated. For this purpose, it may be provided with a double wall section 21a and 21b spaced apart to define an air space 21c between them. This has the advantage that substantially all of the heat which is supplied to the coffee maker will be used in heating up the relatively small quantity of water in the chamber 13, very little of the heat flowing through the wall 21 to the water in the reservoir 18.

As shown, an electric hot plate 30 is provided to heat the water in the compartment 13. The hot plate 30 comprises a frame 31, which preferably will be made of metal, housing an insulating brick 32 which is provided with a spiral channel 33. The heating resistance 34 is threaded through this channel, as shown. The heating resistance 34 is controlled by means of a thermostatic switch 35 comprising a bimetallic thermostatic member 36 positioned adjacent the outer wall of the heating compartment 13, as shown. This blade carries a switch contact 37 which cooperates with a second contact 38 mounted on a spring contact arm 39. The bimetallic strip 36 and the switch arm 39 are electrically connected in the circuit of the hot plate, as shown, so that when the switch contacts are closed the heating resistance 34 is energized, whereas when the contacts are opened, the heating element is deenergized. The thermostat member 36 is set to open the heating circuit when the temperature of the walls of the heating compartment 13 is slightly above the boiling temperature of water so that when the valve 22 is manually latched in its closed position, or in the event it should not open for any reason, the thermostat will open the heating circuit of the hot plate when the wall attains this temperature.

The hot plate is provided with an extension 40 constituting a platform or support for a vessel 41 to support the vessel in position where it will receive the coffee brew from the discharge spout 16 of the coffee compartment. The platform 40 also preferably will be formed of metal and preferably will be a continuation of the frame 31 so that some heat will be transmitted by conduction from the frame 31 to the platform 40 to keep the coffee brew of the vessel 41 warm after the brew has been discharged into the vessel. The platform 40 may be made as a separate member and attached to the frame 31 in any suitable manner, as by screw fastening means. Preferably, the hot plate and platform will be provided with supporting feet 42.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A coffee maker and the like comprising a water chamber, a water heating chamber, a coffee compartment in liquid communication with said heating chamber so that when the water in said heating chamber has been heated sufficiently it is forced into said coffee compartment by the generation of pressure in the heating chamber, a valve controlling the flow of water from the water chamber to the heating chamber, means locking said valve in its closed position, and means responsive to the water level in said heating chamber operating to release said locking means to open said valve when the water level in said heating chamber has fallen to a predetermined low limit, and operating to move said valve to its closed position when a predetermined quantity of water has passed into said heating chamber.

2. A coffee maker comprising two vessels positioned one above the other, the higher being relatively large and constituting a water reservoir and the lower a water heating chamber, a port connecting said chambers, means for heating the water in the lower chamber, a ground coffee container in liquid connection with the lower chamber so that when the water in the lower chamber has been heated sufficiently it is transferred by pressure generated therein to the coffee container to steep the coffee grounds and make a coffee brew, a valve controlling the flow of water from the upper to the lower chamber, a float operating to close said valve when a predetermined quantity of water has been supplied to the lower chamber, means locking said valve in its closed position, and said float operating said locking means to release said valve when the float falls to a predetermined low water level in said water heating chamber.

3. A coffee maker comprising two vessels positioned one above the other, the higher constituting a water reservoir and the lower a water heating chamber, a port connecting said chambers, means for heating the water in the lower chamber, a ground coffee container in liquid communication with the lower chamber so that when the water in the lower chamber has been heated sufficiently it is transferred by pressure generated therein to the coffee container to steep the coffee grounds and make a coffee brew, a valve controlling the flow of water from the upper to the lower chamber, a float operating to close said valve when a predetermined quantity of water has been supplied to the lower chamber, and means controlling the operation of said valve independently of the position of said float.

4. A coffee maker comprising two vessels positioned one above the other, the higher constituting a water reservoir and the lower a water heating chamber, a port connecting said chambers, means for heating the water in the lower chamber, a ground coffee container in liquid communication with the lower chamber so that when the water in the lower chamber has been heated sufficiently it is transferred by pressure generated in the chamber to the coffee container to steep the coffee grounds and make a coffee brew, the coffee container having a port discharging therefrom to permit the coffee brew that has been made to flow from the container, a screen dam over said port opposing the flow of the brew from the container, a valve controlling the flow of water from the upper to the lower chamber, a float operating to close said valve when said lower chamber has been substantially filled, the lower chamber being proportioned so that a maximum of but a relatively few cups of coffee brew can be made at a time, and means controlling said valve so that it may be held open independently of the position of said float.

5. A coffee maker comprising walls defining three vessels positioned vertically one above the other, the top vessel constituting a ground coffee receptacle, the center a water reservoir and the lower a water heating chamber, a water delivering tube connecting the latter with the top vessel, a delivery port between the reservoir and the heating chamber, a float operated valve controlling said port to close the port when a predetermined quantity of water has been supplied to the heating chamber, means locking said valve in its closed position, and said float operating said locking means to release said valve when the float falls to a predetermined low water level in said water heating chamber.

6. A coffee maker comprising walls defining three vessels positioned vertically one above the other, the top vessel constituting a ground coffee receptacle, the center a water reservoir and the lower a water heating chamber, a water delivery tube connecting the latter with the top vessel, a delivery port between the reservoir and the heating chamber, a float operated valve controlling said port to close the port when a predetermined quantity of water has been supplied to the heating chamber, and the top vessel having a discharge port for the coffee brew, an electric hot plate for heating and supporting said vessels so as to heat the water in the heating chamber, the hot plate having a laterally positioned supporting platform in heat conducting relation with the plate, the platform serving to support a portable vessel placed upon it, and the ground coffee receptacle having a spout adapted to discharge into said vessel when placed on the platform.

CARL F. SCOTT.